United States Patent [19]

Fekete et al.

[11] Patent Number: 5,056,848
[45] Date of Patent: Oct. 15, 1991

[54] BODY SKELETON FOR SUPPORTING SUSPENDED PASSENGER SEATS IN VEHICLES

[75] Inventors: Attila Fekete; József Németh; István Raskó; Ákos Fejes, all of Budapest, Hungary

[73] Assignee: Ikarusz Karosszéria és Jármugyár, Budapest, Hungary

[21] Appl. No.: 422,417

[22] Filed: Oct. 17, 1989

[30] Foreign Application Priority Data

Sep. 6, 1989 [HU] Hungary ............................. 4647/89

[51] Int. Cl.⁵ ............................................. B60N 1/00
[52] U.S. Cl. ..................................... 296/63; 296/178; 297/232
[58] Field of Search .................. 296/178, 63; 297/232, 297/450

[56] References Cited

U.S. PATENT DOCUMENTS

| | | | |
|---|---|---|---|
| 2,119,655 | 6/1938 | Stout | 296/178 |
| 2,426,582 | 9/1947 | Austin | 296/178 |
| 3,019,047 | 1/1962 | Ahrens | 296/178 |
| 3,747,979 | 7/1973 | Barecki | 296/63 |
| 4,060,279 | 11/1977 | Vogel | 297/232 |
| 4,167,285 | 9/1979 | Fenner et al. | 296/178 |

Primary Examiner—Robert R. Song
Attorney, Agent, or Firm—Schweitzer Cornman & Gross

[57] ABSTRACT

Seats for a bus attached to a structure that is directly supported from the understructure, and not attached to the side structures of a vehicle, thus avoiding the placing of the seated passenger load on the conventional side structure.

4 Claims, 2 Drawing Sheets 5,056,848

BODY SKELETON FOR SUPPORTING SUSPENDED PASSENGER SEATS IN VEHICLES

FIELD OF THE INVENTION

The invention relates to a complementary latticework for supporting suspended passenger seats, in particular for autobuses and other vehicles for mass transportation.

BACKGROUND OF THE INVENTION

According to prior arts several solutions have been developed for the installation and support of passenger seats of vehicles for mass transportation.

According to one of the methods that found widespread use the seats are mounted by feet to the floor of the vehicle.

According to another solution that is similar to the foregoing one, the structure holding the seats is provided only on one side with a foot, on the other side it is attached to the lateral body skeleton of the vehicle.

According to a further known solution the passenger seat is partly suspended, that means that the passenger seat is installed in the vehicle with supporting means without feet so that one point of attachment is on the lateral body in the height of the window girdle, while the other point of attachment is of the end of the lower inclined support of the seat in area of the lateral body and the floor of the vehicle.

A disadvantageous feature of structures involving feet is that the feet of the seats represent a source of accidents for the passengers, and the passengers when jostled due to dynamic movement of the vehicle, the feet increase the danger of stumbling.

A further disadvantage of the solutions of the prior art is in that feet of the seats make difficult to clean the vehicle, and attachments installed into the floor make manufacturing more complicated. As flooring has to be drilled, insulation of the holes has to be provided to avoid corrosion and attendant problems.

The partly suspended kind of seating is also considered disadvantageous, because it increases loading of the lateral body skelton to an undesired extent. For that reason the lateral skeleton has to be reinforced, involving an increase in the thickness of the lateral body by at least 10 mm, resulting in a considerable additional weight and cost. In case of overloading a window girdle may get elastically deformed resulting in a crack of the side glass.

A method of installing passenger seats is also known, in which the horizontal shank of the seat is fixed to the lateral body while the vertical shank is connected to a carrier attached to the ceiling structure. The disadvantage of this method is that static and dynamic loads resulting from the weight of the seated passengers are fully load the ceiling and the sidewalls. This load can be taken up only by railway body structures that meet high strength requirements. Therefore, this method is applied mainly to trams.

DESCRIPTION OF THE INVENTION

The aim of the present invention is to eliminate the deficiencies of the aforementioned solutions of the prior art, by installing suspended side-seats without feet to avoid undesired loads on the window girdle of the lateral body skeleton and to prevent formation of stress peaks resulting from load transfers, a further aim is to reduce accidents due to stumbling, to facilitate cleaning of the inside of the vehicle, and to avoid problems due to loose connections to bores in the floor.

The invention is based on the recognition that the shortcomings of the prior art are overcome by suspending passenger seats from a body skeleton that is separate from the sidewall structure of the vehicle, so that load should be transferred directly onto the understructure, suitably onto the transverse beam of the understructure.

By connecting the complementary latticework to the frame bending moments resulting from the load on the seats are not loading primarily the lateral body skeleton structure, but introduction can be solved by a latticwork dimensioned on an equalized load without the formation of stress peaks.

We started from the carrier body structure of the partly suspended seat of the type, as described in our preamble, which is a structure of longitudinal, transverse and vertical carriers releasably connected to the lateral body skeleton of the vehicle at the window girdle, of the height of the flooring.

Thus the vertical carrier of the complementary latticework is fixed at two points to the understructure, while the upper part is connected on one side of the seat frame and the other end of the seat frame is held up against a vertical carrier by means of a slanted lattice-rod.

According to further characteristics of the invention it is considered as advantageous that when the vertical carrier is connected directly to the column of the lateral body skeleton, as well as the transverse beam of the understructure, so that the vertical carriers arranged along the lateral body skeleton are interconnected with lower and upper longitudinal bearing elements, together forming a load bearing system. Suitably the upper longitudinal beam forms a unit with the longitudinal beam with the lateral body structure and the supporting surface of the lower longitudinal beam runs perpendicularly to the longitudinal axis of the slanted lattice rod carrying the seat frame.

DESCRIPTION OF THE DRAWING

The invention is described in greater detail through a preferred embodiment thereof of the invention with reference to the drawings, wherein.

Figure 1:
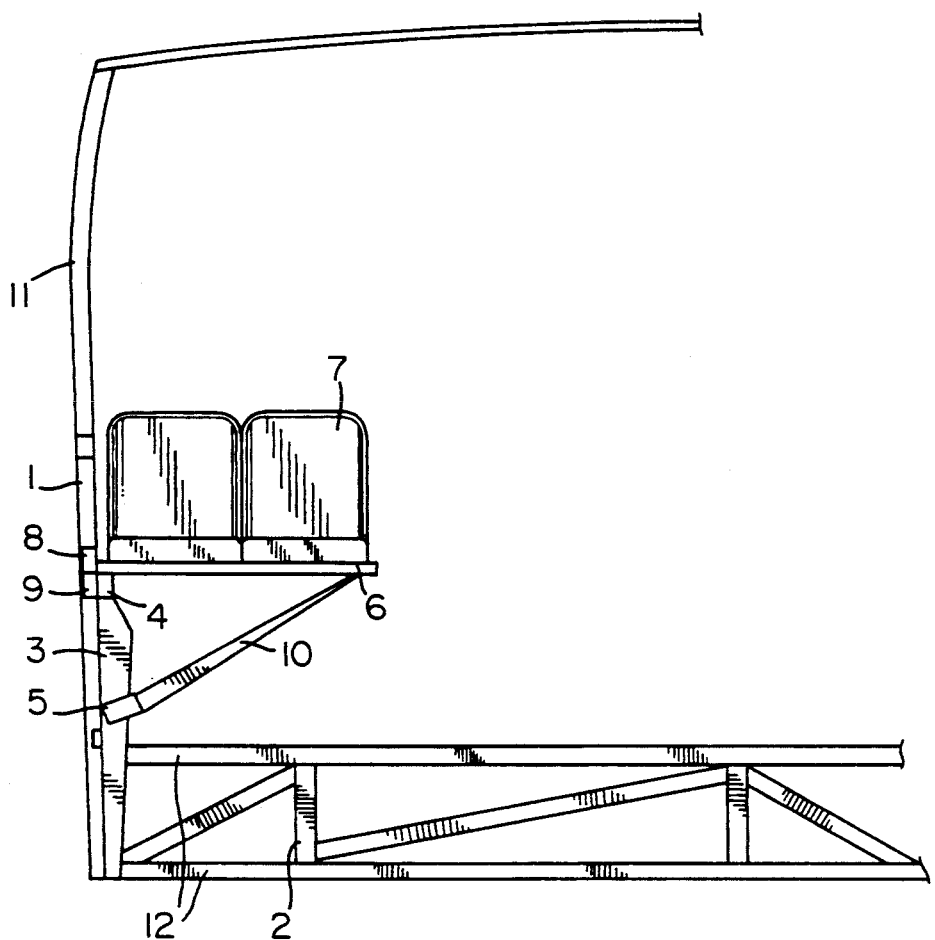
FIG. 1 is a front view of the body latticework according to the invention.

The front view of FIG. 1 illustrates the formation of the skeleton and its arrangement in the vehicle.

As it becomes clear from FIG. 1, a vertical carrier 3 is welded to a column 11 forming the lateral structure 1 and the transverse carrying rods 12 of the understructure. An upper longitudinal beam 4 is fitted to the upper end of the vertical carrier 3 and is connected rigidly to a longitudinal beam 9 of the lateral body structure. A longitudinal seat supporting beam 8 is attached to the upper side of the longitudinal supporting beam 9 of the lateral frame body structure. This upper side is the top side of the beam that has a rectangular cross section. Seats 7 are mounted onto a seat frame 6 carrying the seat. This seat frame 6 is releasably connected to the longitudinal beam 8 of the seat carrier, as well as it bears against a lower longitudinal beam 5 through a slanted lattice rod 10.

Figure 2:
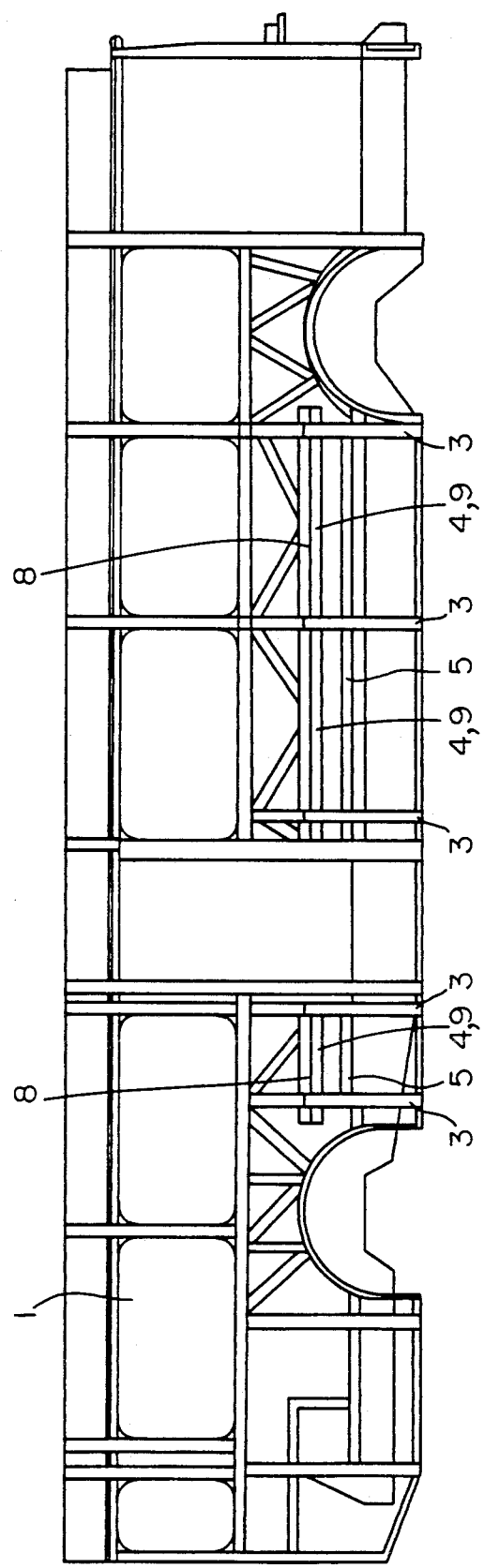
FIG. 2 is the side view of the lateral body structure of an autobus.

FIG. 2 illustrates the side view of the lateral body structure 1 of the bus. Vertical beams 3 are interconnected by the lower 5 and upper longitudinal beams 4 forming collectively a load bearing system. The upper longitudinal beam 4 runs along the lateral body structure 1 with the longitudinal beam 9 of the lateral body structure and the longitudinal beam 8 carrying the seat, thus establishing the possibility that the seat frame 6 could be installed at any desired location along the length of the vehicle interior, and not only adjacent to a vertical carrier 3.

Thus the use of the body skeleton of the present invention assures considerable flexibility in choosing the distance between the seats. Since the longitudinal supporting beams 4, 8, and 9 are contained throughout the entire length of the lateral body skeleton, they admit to locating the seats at any desired point along their length, regardless of the positions of the vertical carriers. By introducing the force through the vertical beam 3, the longitudinal beam 8 fixing the seat and interconnecting the columns 11, the upper longitudinal beam 4 and the lower longitudinal beam 5 assure the proper stiffness for taking up the loads resulting from the loading of the seats, without exerting undue force at any point of the lateral body structure.

We claim:

1. A body skeleton for mounting to the understructure of a bus, passenger seats having seat frames that are not attached to the sidewalls of the bus, said body skeleton being adapted to be attached to the understructure, wherein the body skeleton comprises a vertical supporting beam having an upper and a lower end for attachment at its lower end at least at two points to the understructure, the upper end of said supporting beam being adapted to support a part of said seat frame that is adjacent to said supporting beam, and a slanting supporting rod for supporting a part of the seat frame that is remote from said vertical beam.

2. The body skeleton of claim 1, further comprising an upper longitudinal supporting beam and a lower longitudinal support beam for interconnecting a plurality of said vertical supporting beams into a unitary system for bearing the loading of the seating and transferring said loading directly onto the understructure.

3. The body skeleton of claim 2, wherein the upper ends of the vertical supporting beams are attached to said upper longitudinal support beam.

4. The body skeleton of claim 2, wherein said lower longitudinal beam is disposed on a slant, substantially perpendicularly to the longitudinal axis of said slanting supporting rod.

* * * * *